(12) United States Patent
Wallace et al.

(10) Patent No.: US 6,606,862 B1
(45) Date of Patent: Aug. 19, 2003

(54) HOT OIL INTEGRATED WITH HEAT RECOVERY STEAM GENERATOR AND METHOD OF OPERATION

(75) Inventors: Paul S. Wallace, Katy, TX (US); Kay A. Johnson, Missouri City, TX (US); Janice L. Kasbaum, Seabrook, TX (US)

(73) Assignee: Texaco Inc., San Ramon, CA (US)

( * ) Notice: Subject to any disclaimer, the term of this patent is extended or adjusted under 35 U.S.C. 154(b) by 0 days.

(21) Appl. No.: 09/946,866

(22) Filed: Sep. 5, 2001

(51) Int. Cl.[7] ................................................ F02C 6/18
(52) U.S. Cl. ...................................... 60/772; 60/39.182
(58) Field of Search ............................. 60/39.182, 736, 60/784, 772

(56) References Cited

U.S. PATENT DOCUMENTS

| | | | |
|---|---|---|---|
| 4,031,404 A | | 6/1977 | Martz et al. |
| 4,501,233 A | | 2/1985 | Kusaka |
| 4,932,204 A | * | 6/1990 | Pavel et al. ............... 60/39.182 |
| 5,247,991 A | | 9/1993 | Polcer |
| 5,311,844 A | | 5/1994 | Polcer |
| 5,357,746 A | * | 10/1994 | Myers et al. ............. 60/39.182 |
| 5,417,052 A | | 5/1995 | Bharathan et al. |
| 5,722,354 A | | 3/1998 | Sansoucy |
| 5,730,088 A | | 3/1998 | Foley et al. |
| 5,881,551 A | | 3/1999 | Dang |
| 5,924,389 A | | 7/1999 | Palkes et al. |
| 5,946,901 A | | 9/1999 | Bauver et al. |
| 6,389,797 B1 | * | 5/2002 | Sugishita et al. ............. 60/736 |

* cited by examiner

*Primary Examiner*—Michael Koczo
(74) *Attorney, Agent, or Firm*—Josetta I. Jones

(57) ABSTRACT

The primary object of the present invention is to provide a process and an apparatus to recover heat from a combustion engine turbine exhaust that involves exchanging heat between the combustion engine turbine exhaust and both a heat transfer medium and water. The exhaust is cooled in a series of heat exchange steps that ultimately produces a heated heat transfer medium fluid and superheated steam.

11 Claims, 2 Drawing Sheets

HOT OIL INTEGRATED WITH HEAT RECOVERY STEAM GENERATOR AND METHOD OF OPERATION

BACKGROUND OF THE INVENTION

In the design of modern electric power plants, it is a significant object to achieve the greatest efficiency possible in the generation of electricity. To this end, steam generators are designed to extract heat efficiently from and to use the extracted heat to convert a fluid such as water into superheated steam at a relatively high pressure. Further, such steam generators have been incorporated into combined cycle electric generating plants including both gas and steam turbines wherein the exhaust gases of the gas turbine are used to heat water into steam then to be transferred to the steam turbine. Typically, steam generators include a water heating section or economizer tube, a high pressure evaporator tube and finally a superheater tube, whereby water is gradually heated while increasing levels of pressure are applied thereto to provide from the superheater tube, superheated steam to supply the steam turbine. A condenser is associated with the steam turbine to receive the spent steam therefrom and for converting it into water condensate to be fed back to the steam generator.

In a combined cycle electric power plant, the steam turbine is combined with a gas turbine whereby the heated exhaust gases of the gas turbine, otherwise lost to the atmosphere, are used to heat the circulated water and to convert it into steam to drive the steam turbine. In this manner, a significant reduction in the fuel required to heat the steam is achieved and the heat contained in the gas turbine exhaust gases is effectively utilized.

Although the efficiency of the process is improved by transferring the heat from the exhaust to water to produce steam, steam as a heat source is very inefficient in itself. Using steam as a heat transfer medium for supplying heat to an oil stream in a refinery is inefficient and such a system has significant energy losses. As heat is transferred out of the steam, it is condensed, let down in pressure and reintroduced into the boiler feed water to the steam generator for re-evaporation. Although this sounds efficient, in fact there are usually significant water losses in the steam system due to steam traps and heat loss. Often as much as 50% of the condensed steam is not returned to the steam generator. Therefore, significant make-up water is required, and that water must be obtained and treated to be used to make steam. Thus, it is fairly costly to operate a steam heating system.

Many prior art processes are directed at improving the efficiency of the steam generation system. In U.S. Pat. No. 4,031,404, an improved superheat temperature control for heat recovery steam generators, particularly adapted for use in combined cycle electric power plants, is disclosed. In U.S. Pat. No. 4,501,233, an improved steam generator high and low pressure boiler drums and high and low pressure evaporators is disclosed. U.S. Pat. Nos. 5,247,991 and 5,311,844 provides improved tube arrangements in a heat recovery steam generator (HRSG). In U.S. Pat. No. 5,924,389 an improved water flow circuit for overall plant efficiency is disclosed. Finally, in U.S. Pat. No. 5,946,901 and improved flow distribution of the exhaust gas stream in a heat recovery steam generator is disclosed.

As shown above, a lot of effort has been put into improving the steam generation process. Unfortunately, each of the above mentioned prior art process does not address a major inefficiency: the steam system itself. Thus, it would be desired to develop a system that not only improves the efficiency of a heat recovery steam generator, but also provides a more efficient heat transfer means of transferring heat from a turbine exhaust to, for example, a process stream in a refinery.

SUMMARY OF THE INVENTION

The present invention has been developed in order to maximize the heat recovery from the exhaust from a combustion turbine. This is normally done in an HRSG, where the HRSG is used to preheat water, boil the water, and then superheat the steam. The present invention is directed toward integrating a heat transfer medium with the HRSG to absorb some of the heat from the exhaust.

The present invention is directed to a process to recover heat from a hot gas stream that involves exchanging heat between the combustion engine turbine exhaust and both a heat transfer medium and water. In a preferred embodiment, the process first calls for exchanging heat between the combustion engine turbine exhaust and a heat transfer medium, giving a heated heat transfer medium and a heated heat transfer medium cooled exhaust. Second, heat should be exchanged between the heated heat transfer medium cooled exhaust and steam, giving superheated steam and a superheated steam cooled exhaust. Third, exchanging heat between the superheated steam cooled exhaust and preheated boiler feed water, giving the steam and a steam generation cooled exhaust. Fourth, the steam generation cooled exhaust should exchange heat with the boiler feed water, giving the preheated boiler feed water and preheated boiler feed water cooled exhaust. It is within the contemplation of the present invention, though, that the heat transfer medium can be heated at any point within the HRSG.

It is a further object of the process to include an additional heat exchanging step. A final step of the present invention involves exchanging heat between the preheated boiler feed water cooled exhaust and the heat transfer medium fluid. This can serve as a means for either preheating or cooling the heat transfer medium fluid before the heat transfer medium is exchanged with the exhaust.

A secondary object the present invention is to provide an apparatus to recover heat from a combustion engine turbine exhaust. This apparatus provides a first heat exchanger to exchange heat between the combustion engine turbine exhaust and a heat transfer medium, giving a heated heat transfer medium and a heated heat transfer medium cooled exhaust; a second heat exchanger to exchange heat between the heated heat transfer medium cooled exhaust and steam, giving superheated steam and a superheated steam cooled exhaust; a third heat exchanger to exchange heat between the superheated steam cooled exhaust and preheated boiler feed water, giving the steam and a steam generation cooled exhaust; and a fourth heat exchanger to exchange heat between the steam generation cooled exhaust and boiler feed water, giving the preheated boiler feed water and preheated boiler feed water cooled exhaust.

It is a further aspect of the apparatus to provide a fifth heat exchanger to exchange heat between the preheated boiler feed water cooled exhaust and the heat transfer medium fluid. This can serve as a means for either preheating or cooling the heat transfer medium fluid before the heat transfer medium is exchanged with the exhaust in the first heat exchanger. Preferably, the heat exchangers of the present apparatus are integrated into one process unit for the heat recovery from a combustion engine turbine exhaust, such as an HSRG with an integrated heat transfer medium fluid loop.

DESCRIPTION OF ILLUSTRATIVE EMBODIMENTS

Figure 1:
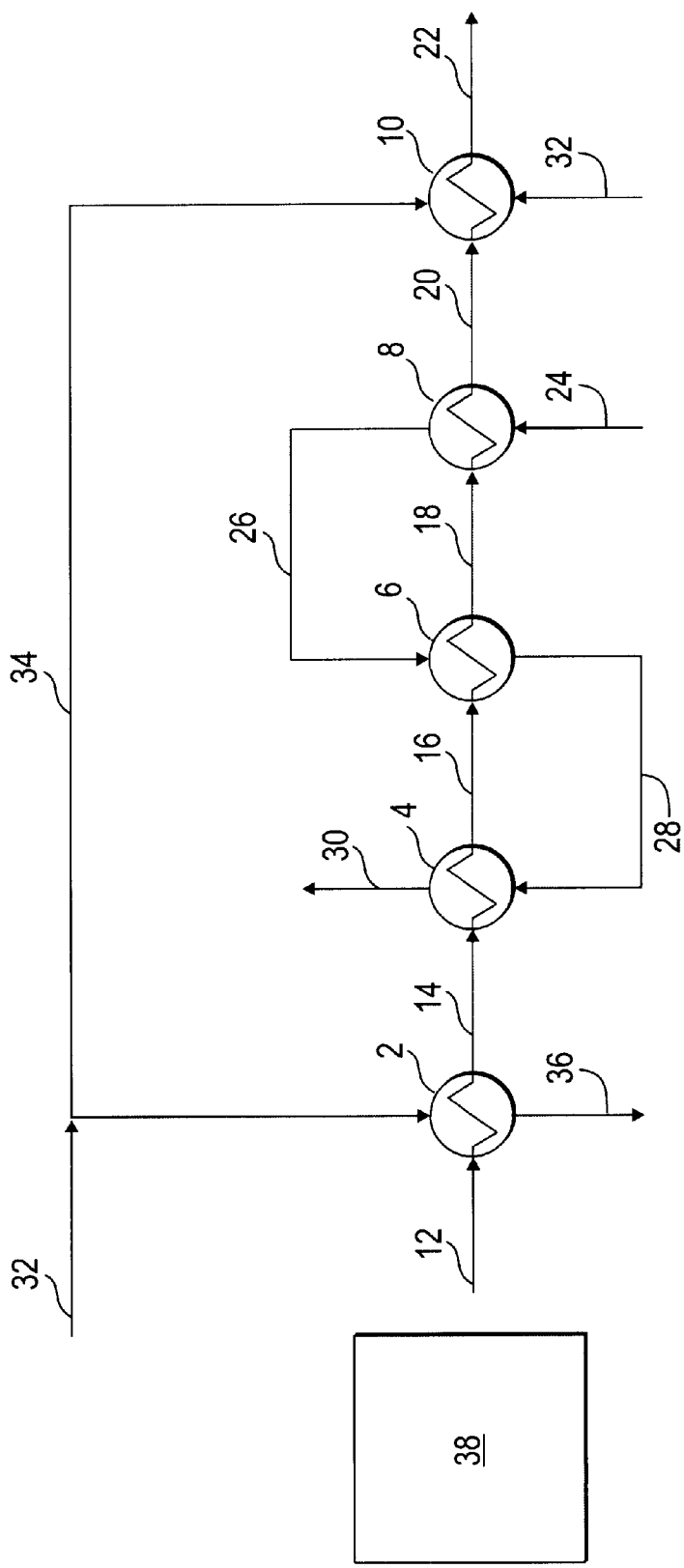
FIG. 1 is a schematic drawing of a preferred embodiment of the method of the present invention.

The present invention is directed toward integrating a heat transfer medium with a heat recovery steam generator to absorb some additional heat from the exhaust of a combustion turbine, whether the turbines are fired on natural gas or synthesis gas from, for example, a gasification reactor in a integrated gasification combined cycle power generation system. While the invention has particular application to recovering heat from the exhaust of a gas turbine used to generate electric power, it will be understood that the invention has other applications, particularly where it is desired to cool a gas stream.

As used herein, the acronym "HRSG" refers to a heat recovery steam generator. Furthermore, the terms "heat transfer medium" and "heat transfer medium fluid" can be used interchangeably. A heat transfer medium fluid can generally be described as a heavy oil that is heated and then used to provide heat, commonly to process streams in a refinery. After being used to provide heat, the heat transfer medium is then sent back to its heating means for reheating and reuse in the process. Many heat transfer medium fluids are known in the art, and it is within the scope of this invention to use them all.

Usually, a HRSG is used to preheat water, boil the water, and then superheat the steam. In this invention, a heat transfer medium is used to absorb a portion of the heat recovered in the HRSG. The heat transfer medium can then be pumped into heat exchangers in a closed circulating hot oil loop where the hot oil provides heat to a process stream such as oil in a refinery.

The heat transfer medium is preferably preheated in the cooler parts of the HRSG. The temperature in these parts are usually about 300° F. to 650° F. (149° C. to 343° C.) and are located after the exhaust has preheated the water, boiled the water, and superheated the superheated steam. The heat transfer medium can then be heated to its required process temperature in the hotter section of the HRSG. The hot section, typically located right at the exhaust inlet to the HRSG, is usually at temperatures between about 650° F. and 1100° F. (343° C. to 593° C.). Different heat transfer mediums can be used, such as DOWTHERM or Coastal Chemical HITEC, and selection of the heat transfer medium will depend on the maximum process temperature in the hot oil loop. The heat transfer medium can be heated to higher temperatures than the typical superheated steam temperature. The maximum superheated steam temperature is usually about 800° F. (426° C.), whereas many heat transfer mediums can be heated to about 1200° F. (649° C.). By being able to be heated to a higher temperature, the heat transfer medium allows for an increase recovery of the heat content of the exhaust, making the entire system more economical and efficient. The exact point at which the heat transfer medium is heated in the HRSG will ultimately depend on the desired heat transfer medium outlet temperature. For instance, if a cooler heat transfer medium is desired, it can be heated in the cooler sections of the HRSG. If hotter heat transfer medium is desired, it can be heated in the hotter sections of HRSG.

The heat transfer medium stays in the liquid phase throughout the heating and, cooling system in a closed circulating hot oil loop. The only pressure losses in such a loop are system losses due to control valves, piping, and heat exchangers. Heat transfer medium material losses are essentially mechanical or degradation losses (5% or less). The heat transfer medium requires periodic filtering to remove pipe scale and other impurities that build up in the system. Small make-up quantities must be added to replace material lost in the filtering process or to reduce the build up of degradation/foulant material. Compared to a steam system, the losses are drastically reduced and the efficiency of the closed loop heating system is greatly enhanced.

A further advantage of integrating a heat transfer medium with a HRSG is that the load from fired heaters can be replaced or significantly reduced. Heated heat transfer medium from an HRSG, which is usually heated in fired heaters, can heat, for example, the process streams of a refinery to their desired temperature without consuming any fuel in the fired heaters. Therefore, there is a positive environmental effect as emissions, such as $SO_x$ or $NO_x$, are reduced because the fuel consumption of the process is reduced.

The heat transfer medium does not totally replace the steam production in the HRSG. Steam is still produced, and the boilers, economizers that preheat the boiler feed water and the superheaters must be sized for minimum heat transfer medium heat load. This protects the tubes in the heat recovery steam generator that contain the heat transfer medium from overheating.

When the load on the heat transfer medium is low due to reduced process heat demand, the heat transfer medium preheater coil located in the cooler parts of the HRSG can be used to reject heat from the heat transfer medium. The main heating coil is then used to reheat the heat transfer medium. By allowing the heat transfer medium to be cooled and then reheated, the circulation through out the closed loop heating system can be maintained, and the heat transfer medium will not be overheated. Overheating the heat transfer medium will destroy it.

Referring now to FIG. 1, a schematic drawing of the preferred embodiment of present method is disclosed. Exhaust 12 from a combustion engine turbine 38 first exchanges heat a heat transfer medium 32 or a preheated or precooled heat transfer medium fluid 34 in a first heat exchanger 2. This gives a heated heat transfer medium 36 and a heated heat transfer medium cooled exhaust 14. The heated heat transfer medium cooled exhaust 14 is then exchanges heat with steam 28 in a second heat exchanger 4. This exchange of heat gives superheated steam 30 and a superheated steam cooled exhaust 16. Heat is then exchanged between the superheated steam cooled exhaust 16 and preheated boiler feed water 26 in a third heat exchanger 6, giving the steam 28 and a steam generation cooled exhaust 18. The steam generation cooled exhaust 18 is then heat exchanged heat with boiler feed water 24 in a fourth heat exchanger 8 giving the preheated boiler feed water 26 and preheated boiler feed water cooled exhaust 20.

Preferably, the preheated boiler feed water cooled exhaust 20 then exchanges heat with the heat transfer medium fluid 32 in a fifth heat exchanger 10. This can serve as a means for either preheating or cooling the heat transfer medium fluid before the heat transfer medium is exchanged with the exhaust. Usually the operation of the fifth heat exchanger 10 will be to preheat the heat transfer medium fluid 32. When the external heat load on the heat transfer medium fluid 32 is low, the fifth heat exchanger can be used to reject heat from the heat transfer medium fluid 32. This will help to maintain flow in the external heat transfer medium flow loop and to prevent degradation of the heat transfer medium fluid 32 caused by overheating. It is within the scope of this invention that the aforementioned heat exchange steps be performed in any order. The sequence listed is the preferred and most economical embodiment of the present invention.

Figure 2:
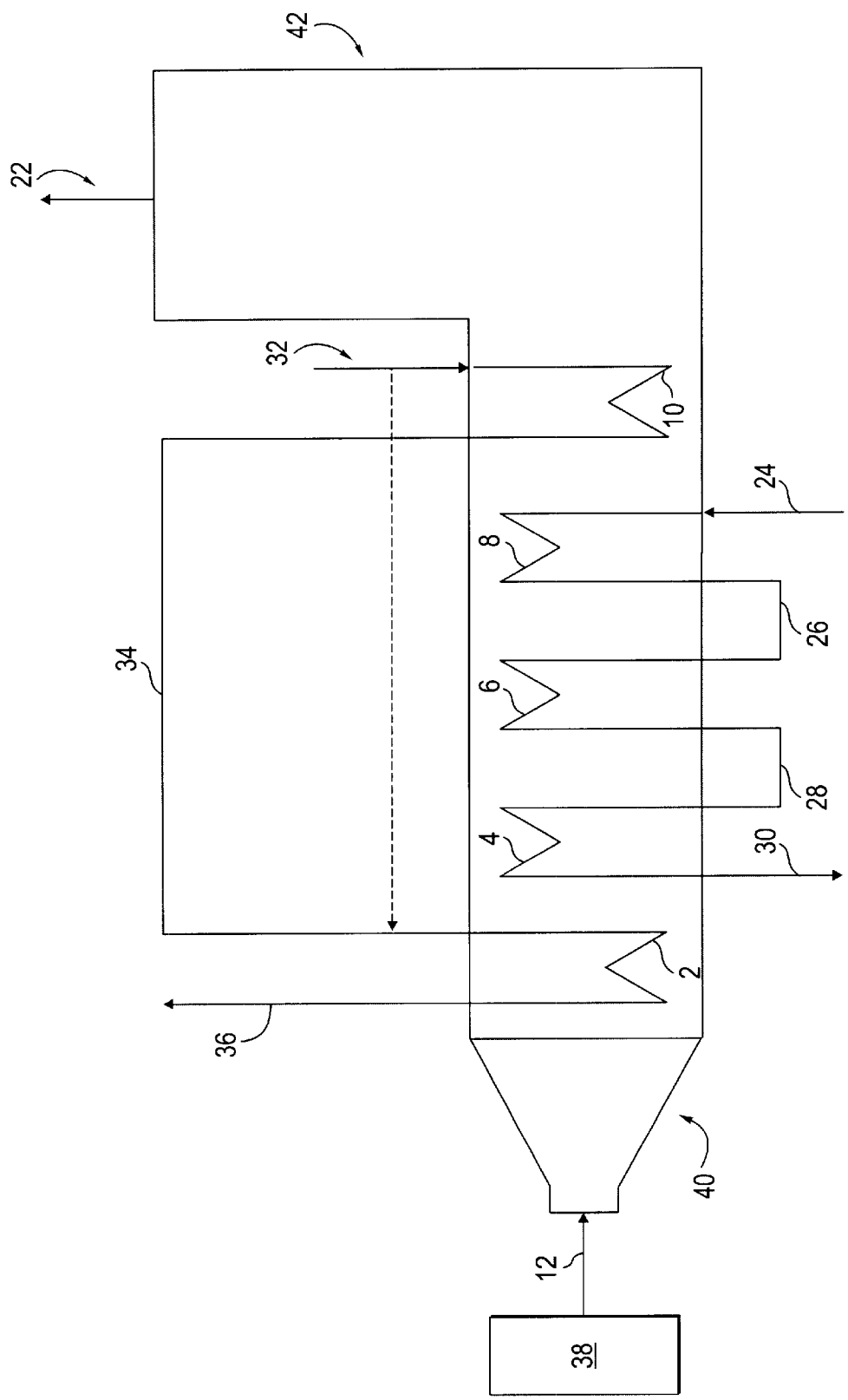
FIG. 2 is a preferred apparatus of the present invention.

FIG. 2 discloses the preferred apparatus, an integration of the five heat exchangers into one process unit. It should be noted at this point that for purposes of the present disclosure, the reference numbers assigned to items or objects already discussed or disclosed in FIG. 1 remain the same in FIG. 2. Thus, for instance, the exhaust 12 from a combustion engine turbine (not shown) shown for the first time in FIG. 1 and assigned the reference number 12 has retained this same number in FIG. 2.

In FIG. 2, the preferred apparatus of the present invention is the heat recovery steam generator (HRSG) 40 adapted for the additional heating of a heat transfer medium fluid. Like FIG. 1, exhaust 12 from a combustion engine turbine 38 first exchanges heat a heat transfer medium 32 or a preheated or precooled heat transfer medium fluid 34. This heat exchange occurs inside the HRSG 40, preferably in heat exchange tubes 2, the equivalent of the first heat exchanger 2 of FIG. 1. Heat exchange tubes 4, 6 and 8, the equivalents of the second 4, third 6 and fourth 8 heat exchangers of FIG. 1 respectively, are then used to generate superheated steam 30 from boiler feed water 24. Typically, heat exchange tube 8 will be a water heating section or economizer tube, heat exchange tube 6 will be a high pressure evaporator tube and finally a heat exchange tube 4 will be a superheater tube. Finally, heat exchange tubes 10, the equivalent of the heat exchanger 10 of FIG. 1, preheat or precool the heat exchange transfer medium fluid 32. After preheating or precooling the heat transfer medium fluid 32, the now substantially cooled exhaust 22 is rejected from the HRSG 40 through stack 42. The HRSG of the present invention may carry out the above heat exchange steps in any order. The sequence listed is the preferred embodiment, as this is the most economical and most efficient means of recovering the heat from the exhaust from a combustion turbine.

Based on the present disclosure, one of ordinary skill in the art should recognize that the present invention encompasses a process to recover heat from a combustion engine turbine exhaust that involves exchanging heat between the combustion engine turbine exhaust and both a heat transfer medium and water. In a preferred embodiment, the process first calls for exchanging heat between the combustion engine turbine exhaust and a heat transfer medium, giving a heated heat transfer medium and a heated heat transfer medium cooled exhaust. Second, heat should be exchanged between the heated heat transfer medium cooled exhaust and steam, giving superheated steam and a superheated steam cooled exhaust. Third, exchanging heat between the superheated steam cooled exhaust and preheated boiler feed water, giving the steam and a steam generation cooled exhaust. Fourth, the steam generation cooled exhaust should exchange heat with the boiler feed water, giving the preheated boiler feed water and preheated boiler feed water cooled exhaust.

It should also be recognizable that the present process may further encompass an additional heat exchanging step. A final step of the present invention involves exchanging heat between the preheated boiler feed water cooled exhaust and the heat transfer medium fluid. This can serve as a means for either preheating or cooling the heat transfer medium fluid before the heat transfer medium is exchanged with the exhaust.

One of ordinary skill in the art should also recognize that the present invention encompasses an apparatus to recover heat from a combustion engine turbine exhaust. This apparatus provides a first heat exchanger to exchange heat between the combustion engine turbine exhaust and a heat transfer medium, giving a heated heat transfer medium and a heated heat transfer medium cooled exhaust; a second heat exchanger to exchange heat between the heated heat transfer medium cooled exhaust and steam, giving superheated steam and a superheated steam cooled exhaust; a third heat exchanger to exchange heat between the superheated steam cooled exhaust and preheated boiler feed water, giving the steam and a steam generation cooled exhaust; and a fourth heat exchanger to exchange heat between the steam generation cooled exhaust and boiler feed water, giving the preheated boiler feed water and preheated boiler feed water cooled exhaust.

It is also recognizable that the apparatus may further encompass a fifth heat exchanger to exchange heat between the preheated boiler feed water cooled exhaust and the heat transfer medium fluid. This can serve as a means for either preheating or cooling the heat transfer medium fluid before the heat transfer medium is exchanged with the exhaust in the first heat exchanger. Finally, one of ordinary skill in the art should recognize that the apparatus of the present invention prefers that the heat exchangers are integrated into one process unit for the heat recovery from a combustion engine turbine exhaust, such as a HRSG.

Finally, one of ordinary skill in the art should recognize that the present invention encompasses a process recover heat from a combustion engine turbine exhaust comprising exchanging heat between the combustion engine turbine exhaust and a heat transfer medium and exchanging heat between the combustion engine turbine exhaust and boiler feed water. The present invention also encompasses an apparatus for recovering heat from a combustion engine turbine exhaust comprising a means for exchanging heat between the combustion engine turbine exhaust and a heat transfer medium and a means for exchanging heat between the combustion engine turbine exhaust and boiler feed water, in either order.

While the apparatuses and methods of the present invention have been described in terms of preferred embodiments, it will be apparent to those of skill in the art that variations may be applied to what has been described herein without departing from the concept and scope of the invention. All such similar substitutes and modifications apparent to those skilled in the art are deemed to be within the scope and concept of the invention as it is set out in the following claims.

What is claimed is:

1. A process to recover heat from a combustion engine turbine exhaust comprising:
   a) exchanging heat between the combustion engine turbine exhaust and a heat transfer medium, giving a heated heat transfer medium and a heated heat transfer medium cooled exhaust;
   b) exchanging heat between the heated heat transfer medium cooled exhaust and steam, giving superheated steam and a superheated steam cooled exhaust;
   c) exchanging heat between the superheated steam cooled exhaust and preheated boiler feed water, giving the steam and a steam generation cooled exhaust; and
   d) exchanging heat between the steam generation cooled exhaust and boiler feed water, giving the preheated boiler feed water and preheated boiler feed water cooled exhaust.

2. The process of claim 1, further comprising exchanging heat between the preheated boiler feed water cooled exhaust and the heat transfer medium fluid so as to preheat the heat transfer medium fluid before the heat transfer medium is heat exchanged with the combustion engine turbine exhaust.

3. The process of claim 1, further comprising exchanging heat between the preheated boiler feed water cooled exhaust and the heat transfer medium fluid so as to cool the heat transfer medium fluid before the heat transfer medium is heat exchanged with the combustion engine turbine exhaust.

4. An apparatus to recover heat from a combustion engine turbine exhaust comprising:
- a) a first heat exchanger to exchange heat between the combustion engine turbine exhaust and a heat transfer medium, giving a heated heat transfer medium and a heated heat transfer medium cooled exhaust;
- b) a second heat exchanger to exchange heat between the heated heat transfer medium cooled exhaust and steam, giving superheated steam and a superheated steam cooled exhaust;
- c) a third heat exchanger to exchange heat between the superheated steam cooled exhaust and preheated boiler feed water, giving the steam and a steam generation cooled exhaust; and
- d) a fourth heat exchanger to exchange heat between the steam generation cooled exhaust and boiler feed water, giving the preheated boiler feed water and preheated boiler feed water cooled exhaust.

5. The apparatus of claim 4, wherein the first, second, third, and fourth heat exchangers are integrated.

6. The apparatus of claim 4, further comprising a fifth heat exchanger to exchange heat between the preheated boiler feed water cooled exhaust and the heat transfer medium fluid so as to preheat the heat transfer medium fluid before the heat transfer medium is heated by the exhaust in the first heat exchanger.

7. The apparatus of claim 6, wherein the first, second, third, fourth and fifth heat exchangers are integrated.

8. The apparatus of claim 4, further comprising a fifth heat exchanger to exchange heat between the preheated boiler feed water cooled exhaust and the heat transfer medium fluid so as to cool the heat transfer medium fluid before the heat transfer medium is heated by the exhaust in the first heat exchanger.

9. The apparatus of claim 8 wherein the first, second, third, fourth, and fifth heat exchangers are integrated.

10. A process comprising exchanging heat between a hot gas stream and a heat transfer medium and exchanging heat between the hot gas stream and boiler feed water so as to heat the heat transfer medium and to produce steam from the boiler feed water.

11. An apparatus comprising a means for exchanging heat between a hot gas stream and a heat transfer medium and a means for exchanging heat between the hot gas stream and boiler feed water so as to heat the heat transfer medium and to produce steam from the boiler feed water.

* * * * *